United States Patent
Schnöll et al.

(10) Patent No.: US 12,536,809 B2
(45) Date of Patent: Jan. 27, 2026

(54) SENSOR SYSTEM FOR CAPTURING THE ENVIRONMENT OF AT LEAST A FIRST AND A SECOND VEHICLE UNIT PIVOTABLY COUPLED TO ONE ANOTHER

(71) Applicant: Continental Engineering Services GmbH, Frankfurt (DE)

(72) Inventors: Patrick Schnöll, Frankfurt am Main (DE); Sebastian Ferch, Frankfurt am Main (DE)

(73) Assignee: Continental Engineering Services GmbH, Frankfurt (DE)

( * ) Notice: Subject to any disclaimer, the term of this patent is extended or adjusted under 35 U.S.C. 154(b) by 981 days.

(21) Appl. No.: 17/172,315

(22) Filed: Feb. 10, 2021

(65) Prior Publication Data

US 2021/0256276 A1 Aug. 19, 2021

(30) Foreign Application Priority Data

Feb. 18, 2020 (DE) .................. 10 2020 202 039.6

(51) Int. Cl.
| | |
|---|---|
| *G06V 20/58* | (2022.01) |
| *B60W 10/30* | (2006.01) |
| *G06F 16/901* | (2019.01) |

(52) U.S. Cl.
CPC ............ *G06V 20/58* (2022.01); *B60W 10/30* (2013.01); *G06F 16/901* (2019.01); *B60W 2420/408* (2024.01); *B60W 2422/95* (2013.01)

(58) Field of Classification Search
CPC ....... G06V 20/58; G06F 16/901; G01S 13/87; G01S 13/931; G01S 17/931; G01C 21/26;
(Continued)

(56) References Cited

U.S. PATENT DOCUMENTS

| | | | |
|---|---|---|---|
| 6,894,608 B1 * | 5/2005 | Gunderson | ............ B60Q 9/006 340/471 |
| 9,211,889 B1 * | 12/2015 | Hoetzer | ................. B60Q 9/008 |

(Continued)

FOREIGN PATENT DOCUMENTS

| | | |
|---|---|---|
| CN | 107438546 A | 12/2017 |
| CN | 110337597 A | 10/2019 |

(Continued)

OTHER PUBLICATIONS

Extended European Search Report for European Application No. 21 156 330.9, dated Jul. 13, 2021. with partial English translation, 13 pages.

(Continued)

*Primary Examiner* — Carl C Staubach
(74) *Attorney, Agent, or Firm* — Buchanan Ingersoll & Rooney P.C

(57) ABSTRACT

A sensor system including at least a first and a second sensor unit. The sensor system is designed to at least partially capture the environment of at least a first and second vehicle unit pivotably coupled to one another. The first sensor unit is positionable on the first vehicle unit and the second sensor unit is positionable on the second vehicle unit. The first and second sensor unit capture different environmental areas. The sensor system has an electronic control unit connected to the first and second sensor unit and designed such that it jointly evaluates output data from the first and second sensor unit. The first and the second sensor unit each provide their sensor data with a synchronized item of time information. The electronic control unit is designed such that it takes into account relative positioning of the first and second sensor unit when generating an environmental model.

12 Claims, 2 Drawing Sheets

(58) Field of Classification Search
CPC .............. G01C 21/3804; B60W 10/30; B60W 2420/52; B60W 2422/95
See application file for complete search history.

(56) References Cited

U.S. PATENT DOCUMENTS

| | | | |
|---|---|---|---|
| 10,235,887 | B2 | 3/2019 | Stahl |
| 10,857,896 | B2* | 12/2020 | Bridges .................. B60L 53/14 |
| 10,942,269 | B2 | 3/2021 | Geiger et al. |
| 11,194,045 | B2 | 12/2021 | Schmidt et al. |
| 11,200,430 | B2* | 12/2021 | Luo ......................... G01S 17/42 |
| 11,314,247 | B2* | 4/2022 | Biehler ................ G05D 1/0212 |
| 2008/0238636 | A1* | 10/2008 | Birging ............... B60R 25/1004 340/933 |
| 2014/0005875 | A1 | 1/2014 | Hartmann et al. |
| 2014/0176716 | A1* | 6/2014 | Wallat .................. B62D 15/025 348/148 |
| 2015/0286878 | A1 | 10/2015 | Molin et al. |
| 2017/0280091 | A1 | 9/2017 | Greenwood et al. |
| 2017/0334355 | A1* | 11/2017 | Hubbell ................ G01S 13/931 |
| 2018/0141496 | A1 | 5/2018 | Loehr et al. |
| 2019/0056492 | A1* | 2/2019 | Geiger .................. G01S 13/931 |
| 2019/0126851 | A1 | 5/2019 | Greenwood |
| 2019/0129429 | A1* | 5/2019 | Juelsgaard ........... G05D 1/0231 |
| 2021/0256276 | A1* | 8/2021 | Schnöll ................ G06F 16/901 |
| 2022/0076030 | A1* | 3/2022 | Anguelov .............. G06V 20/56 |

FOREIGN PATENT DOCUMENTS

| | | |
|---|---|---|
| DE | 10 2012 203 182 A1 | 9/2012 |
| DE | 10 2015 105 248 A1 | 10/2015 |
| DE | 10 2015 214 611 A1 | 2/2017 |
| DE | 102017118588 A1 | 2/2019 |
| DE | 10 2018 218 194 A1 | 5/2019 |

OTHER PUBLICATIONS

Chinese Office Action for Chinese Application No. 202110183301.2, dated Jan. 18, 2023 with translation, 12 pages.
Chinese Office Action for Chinese Application No. 202110183301.2, dated Aug. 14. 2023 with translation, 13 pages.
Office Action (Invitation to oral proceedings pursuant to Rule 115(1) EPC and communication from the Examining Division) issued Jul. 7, 2025, by the European Patent Office in corresponding European Patent Application No. 21 156 330.9-1009 and an English machine translation of the Office Action. (20 pages).
Aeberhard et al., "High-Level Sensor Data Fusion Architecture for Vehicle Surround Environment Perception", Proceedings / 8th international workshop on intelligent transportation, (Mar. 22-23, 2011), vol. 6. (7 pages).
Ghahroudi et al., "Multisensor Data Fusion Strategies for Advanced Driver Assistance Systems", Sensor and Data Fusion. IntechOpen, (Feb. 2009), pp. 141-166.
Rehder et al., "A General Approach to Spatiotemporal Calibration in Multisensor Systems", IEEE Transactions on Robotics, (Apr. 2016), vol. 32, No. 2, pp. 383-398.
Office Action issued Mar. 25, 2025, by the German Patent Office in corresponding German Patent Application No. 10 2021 201 273.6 and an English machine translation of the Office Action. (16 pages).
European Communication pursuant to Article 94(3) for European Application No. 21 156 330.9, issued Jan. 4, 2024 with English translation, 16 pages.
Druml et al., "Prystine—Technical Progress After Year 1", 2019 22nd Euromicro Conference on Digital System Design (DSD), IEEE, (Aug. 28, 2019), pp. 389-398.
Office Action (Communication pursuant to Article 94(3) EPC) issued Aug. 27, 2024, by the European Patent Office in corresponding European Patent Application No. 21 156 330.9-1009 and an English machine translation of the Office Action. (22 pages).

* cited by examiner

SENSOR SYSTEM FOR CAPTURING THE ENVIRONMENT OF AT LEAST A FIRST AND A SECOND VEHICLE UNIT PIVOTABLY COUPLED TO ONE ANOTHER

CROSS REFERENCE TO RELATED APPLICATIONS

This application claims priority to German Patent Application No. 10 2020 202 039.6, filed Feb. 18, 2020, the contents of such application being incorporated by reference herein.

FIELD OF THE INVENTION

The invention relates to a sensor system and to a method for generating or calculating an at least two-dimensional map of an environmental model.

SUMMARY OF THE INVENTION

An aspect of the invention is based on proposing a sensor system and a corresponding method, in which output data from different sensor units can be jointly evaluated in an improved or precise or robust manner with one another.

The first and second sensor units preferably each provide their sensor data in a manner provided with an item of synchronized time information, which means, in particular, that the items of time information in the sensor data from the different sensor units have a common time base or time reference.

The sensor system is preferably designed such that it comprises at least a first and a second sensor unit, wherein the sensor system is designed to at least partially or substantially completely capture, at least in a first plane, the environment of at least a first and a second vehicle unit pivotably coupled to one another,
  wherein the first and the second sensor unit can be positioned or are positioned separately from one another,
  wherein the first sensor unit is positionable/positioned on the first vehicle unit and the second sensor unit is positionable/positioned on the second vehicle unit, wherein the first and the second sensor unit capture different environmental areas, wherein the sensor system has an electronic control unit which is connected to or communicates with the first and the second sensor unit and is designed such that it jointly evaluates the output data from the first and second sensor unit, wherein
  the first and the second sensor unit each provide their sensor data in a manner provided with an item of synchronized time information, in particular synchronized by means of the electronic control unit, and the electronic control unit is designed such that it takes into account the relative positioning of the first and second sensor unit, in particular relative to each other, when generating an environmental model.

The sensor units are preferably designed in such a way that they each provide output data which each have an item of time information. The sensor units are particularly preferably designed in such a way that each output data word or each output data record has an item of time information.

It is preferred that the first and the second sensor unit are positioned in a manner pivotable by a defined pivot angle $\Theta$ relative to one another in terms of their relative positioning with respect to a first defined axis and that the electronic control unit is designed such that the pivot angle $\Theta$ and/or an item of information dependent thereon is/are taken into account when generating the environmental model at least at defined times, in particular at synchronous times with respect to a common time base.

It is expedient that the environmental model is designed such that it has an at least two-dimensional map of positions and/or coordinates which has been/is stored and/or calculated in the electronic control unit and in which points and/or objects captured and/or detected by the first and the second sensor unit are provided as output data from the first and second sensor unit and are entered and/or included in the at least two-dimensional map, depending at least on the respective time information in the output data and the temporally substantially equal and/or synchronous pivot angle $\Theta$.

In particular, the captured or detected points/objects are static points/objects that are captured by the sensor units as being static or stationary relative to the corresponding sensor unit.

It is preferred that the at least two-dimensional map of the environmental model is in the form of a first table and/or matrix and/or database and, in particular, depicts a substantially two-dimensional map in which the sensor system is located and/or through which the sensor system is moved.

The at least two-dimensional map is expediently the environmental model itself.

The output data from the first and second sensor unit preferably each have at least the point in time and the distance and/or an item of position information and/or a speed and/or relative speed of detection of a point and/or an object by the corresponding sensor unit.

It is preferred that an item of information relating to the positioning in the sense of the static fastening of each sensor unit is available in the electronic control unit, wherein this information relating to the positioning is defined, in particular, relative to a reference coordinate system of at least one of the vehicle units, particularly preferably the vehicle unit in which the sensor unit is positioned, stored and/or present, and at least one item of driving dynamics information relating to the first and/or the second vehicle unit is available, in particular the speed in the longitudinal direction of the vehicle unit, and the pivot angle $\Theta$ between the first and second vehicle unit, and that, at least on the basis of this information, the electronic control unit calculates a sensor unit position or the position of the sensor unit for each sensor unit at defined times and calculates data of the environmental model on the basis of this sensor unit position and the output data from the sensor units.

It is expedient that the environmental model comprises static environmental data relating to points and/or objects captured by the sensor units, which are stored and/or calculated in an at least two-dimensional map of the environmental model as a first table and/or matrix and/or database,
  and dynamic environmental data, which are stored and/or calculated in an additional table and/or matrix and/or database and are generated on the basis of points and/or objects captured by the sensor units, wherein these points and/or objects have a speed themselves that differs from zero,
  or that the dynamic environmental data are stored and/or calculated in the first table and/or matrix and/or database, wherein the dynamic information is contained in the changes to the data records with different time stamps.

It is preferred that the at least two-dimensional map of the environmental model in the electronic control unit accesses further information and/or is supplemented with further information, from positions and/or coordinates for captured objects from a satellite navigation system and/or an externally generated at least two-dimensional map of the area traversed by the vehicle units.

It is expedient that the electronic control unit calculates a position or a respective position of the first and/or second vehicle unit at least from the output data from the first and second sensor unit and the data from the at least two-dimensional map of the environmental model; in particular, this position of the first and/or second vehicle unit is provided in coordinates of the two-dimensional map and/or in global GPS coordinates.

It is expedient that the electronic control unit evaluates or assigns the data in such a way that points or objects in the static environmental data are evaluated and/or treated, for example, as a traffic infrastructure or landscape elements and the objects in the dynamic environmental data are evaluated and/or treated as road users.

An object is preferably understood as meaning a group of a plurality of points and/or sensor measurement data that can be assigned jointly.

At least the first and the second sensor unit are preferably embodied as a radar sensor unit, which in particular provides an item of relative speed information for captured points/objects, and/or as a camera unit and/or as an ultrasonic sensor unit and/or as a lidar unit (light detection and ranging), which in particular provides an item of intensity or light intensity information for captured points/objects.

A preferred embodiment of the first and the second sensor unit each as a radar unit makes it possible, for example, to efficiently determine/calculate the relative speed of the captured points/objects with respect to the capturing sensor unit.

The term electronic control unit, in particular as a calculation and data/signal processing unit, is abbreviated with the abbreviation ECU.

The first and the second sensor unit are preferably designed and positioned in such a way that their various captured environmental areas overlap, in particular at least partially, particularly preferably on the basis of the pivot angle $\Theta$.

The term environment is preferably understood as meaning the environment or area in which the vehicle units are located and/or in or through which the vehicle units move or can move, in particular in relation to the respective environmental areas captured by the sensor units and at least one reference point or a reference coordinate system, for example center/central point of the front axle or center of gravity of the first or second vehicle unit, which is expediently linked to a vehicle unit in a defined manner.

Expediently, an environmental model is understood as meaning a defined representation of the environment or an environmental representation, in particular embodied as a table or matrix or database, in which position data with regard to a defined space/captured environmental area are entered together, wherein each position data item relating to an object/point that is captured by the corresponding sensor unit is entered or calculated with regard to or on the basis of the position of the sensor unit itself, in particular its capture area.

The first and/or second sensor unit preferably provide, as output data, reflection points and/or transit times and/or distances and/or points in time for captured points/objects.

The sensor system is preferably designed such that the pivot angle $\Theta$
is captured by a pivot angle sensor. Alternatively, the pivot angle $\Theta$ is preferably calculated and/or estimated in the ECU on the basis of the output data from at least the first and second sensor unit and in particular optionally a third sensor unit.

The ECU preferably respectively calculates an item of coordinate information or geometric spatial information, in particular with regard to the at least two-dimensional map, for each captured point or each captured object from the provided sensor data.

The first and second sensor unit are preferably each positioned and/or fastened on or in the first and second vehicle unit, respectively.

The wording pivotably coupled to one another is preferably understood as meaning a relative rotation or a rotational degree of freedom relative to one another about the vertical axis of the first and second vehicle unit.

A first and second vehicle unit is preferably understood as meaning a truck with a trailer or a tractor unit with a semitrailer/trailer or a first part of a bus and a second part of a bus pivotably coupled thereto, or a utility vehicle or industrial vehicle which comprises at least two pivotably coupled vehicle units or a rail vehicle with at least a first and a second pivotably coupled vehicle unit, for example a railcar with one wagon or two wagons coupled to one another.

Electronic control unit, ECU, is preferably designed as a separate unit or integrated into one of the sensor units or designed to be distributed in at least two sensor units.

The first and second sensor unit preferably each generate and provide output data which have a defined time stamp that is assigned to the point in time when the environment is captured.

The first and second sensor unit each preferably generate the output data synchronously, in relation to a common time base of the ECU, or the sensor units and the ECU have a common time base, for example provided by a bus and/or in each case a clock generator/timer unit.

An item of time information is preferably understood as meaning a time stamp or a corresponding date and vice versa.

The term synchronous is preferably understood as meaning the fact that the sensor units, or together with the ECU, act at defined times in relation to a common time base or perform calculations or provide data.

The relative speed of a captured point/object relative to the capturing sensor unit is preferably used in the first and/or second sensor unit or the ECU to calculate a speed of the captured point/object itself, in particular as a speed relative to a stationary reference point or stationary reference coordinate system of the environment or the at least two-dimensional map of the environmental model.

The term of the speed of the points or objects themselves is preferably understood as meaning a relative speed relative to a stationary reference point or stationary reference coordinate system of the environment or the at least two-dimensional map of the environmental model.

REFERENCE SIGNS

A First vehicle unit
B Second vehicle unit
$\Theta 1$ Pivot angle between first and second vehicle unit
1 to 5 Sensor units positioned on/in the first vehicle unit
6 to 9 Sensor units positioned on/in the second vehicle unit
10 Driving dynamics information
11 Pivot angle information
12 Relative positioning of the sensor units 19 Sensor unit position for each sensor unit
20 Static environmental data relating to the environmental model
21 Dynamic environmental data relating to the environmental model
22 Two-dimensional map of the environmental model
30 Environmental model
31 Vehicle position

DETAILED DESCRIPTION OF THE PREFERRED EMBODIMENTS

Figure 1:
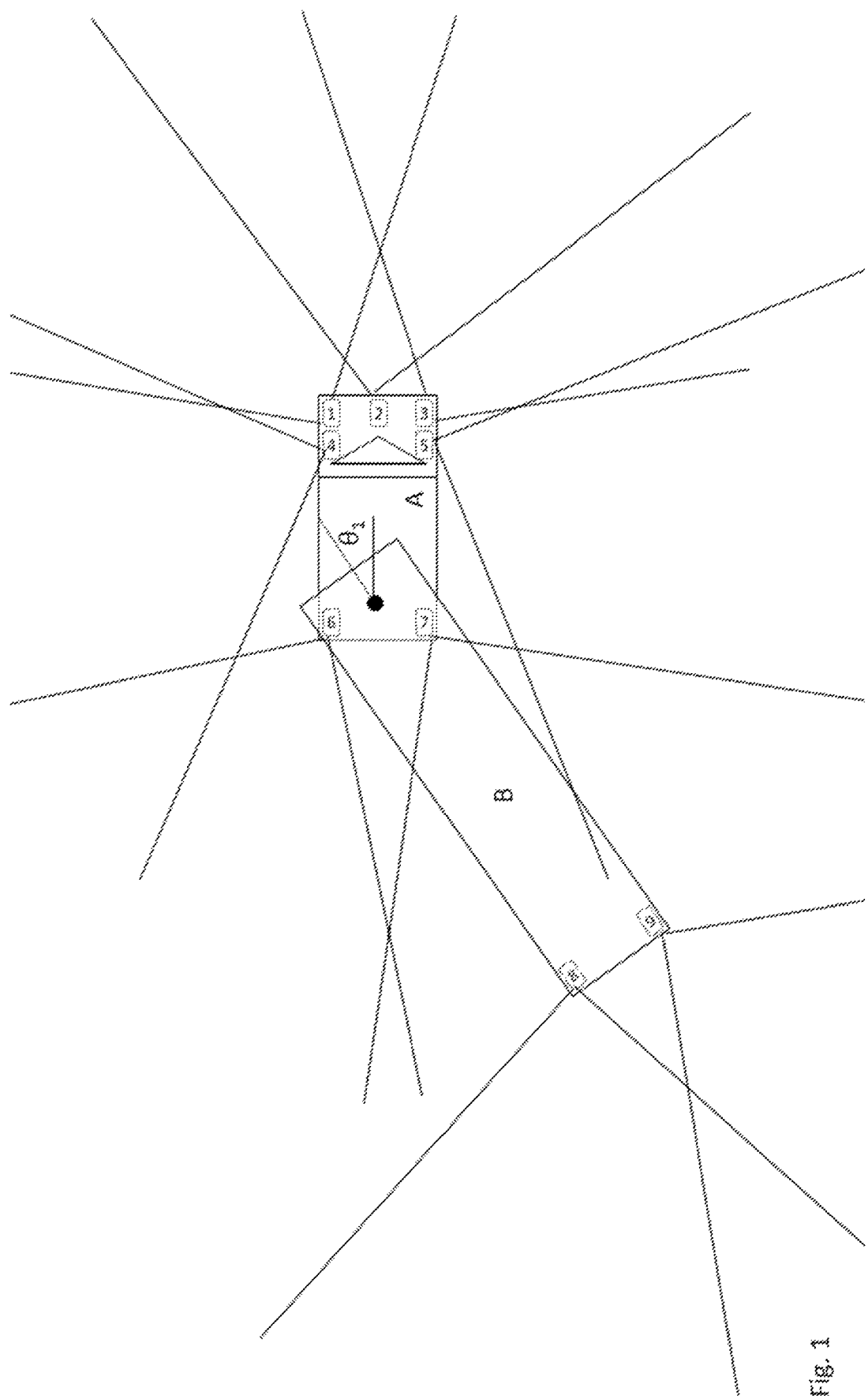
FIGS. 1 and 2 each show, in a schematic representation, exemplary aspects of the sensor system and the method.

FIG. 1 shows, by way of example, a first and a second vehicle unit A, B, designed by way of example as a towing vehicle A and trailer B, which can be rotated or pivoted relative to one another by the pivot angle Θ1. The first vehicle unit A has the environmental sensors 1 to 5, which capture the environment, substantially to the front and to the side of the towing vehicle, and the second vehicle unit B has the environmental sensors 6 to 9. By way of example, the first sensor unit 1 and the second sensor unit 8 are positioned separately from one another on the two pivotably coupled vehicle units. An ECU (not shown) jointly evaluates the output data from the environmental sensors 1 to 9, wherein the output data each synchronously provide or have an item of time information for the respective output data.

The respective capture area of each of the sensor units 1 to 9 is illustrated by way of example by the two beams each emanating from the sensor unit, wherein the capture area is in each case substantially laterally bounded by these two beams.

Figure 2:
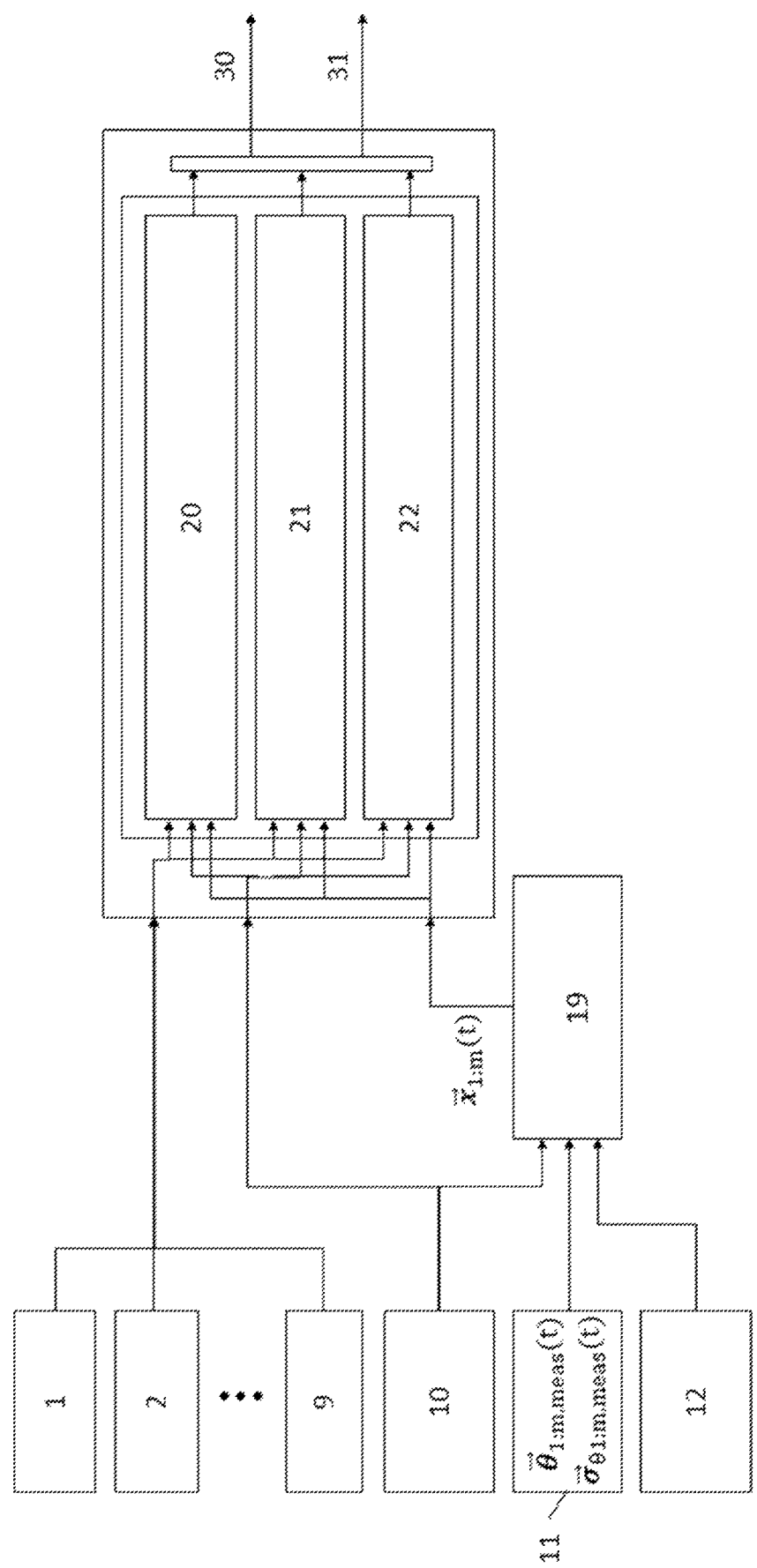

The mode of operation of the sensor system is illustrated by way of example on the basis of FIG. 2, wherein the function blocks 19, 20, 21 and 22 are embodied in the electronic control unit, also called the ECU. The ECU is provided with the output data or output signals from the sensor units 1 to 9, as well as vehicle dynamics signals or driving dynamics information 10, which in particular include the speed of the first and second vehicle unit themselves, as well as the pivot angle data Θ1 and an item of information relating to the variance of the pivot angle data Θ1, using the function block 11. In addition, the static positioning parameters of the sensor units or static installation parameters or the data relating to the relative positioning of the sensor units are available to the ECU in function block 12.

The ECU generates an environmental model, which can also be understood, for example, as a world perception, wherein static environmental data 20 and dynamic environmental data 21 are calculated as well as a map creation 22 of an at least two-dimensional map. From these data, the ECU calculates, for example, a vehicle position 30 based on the two-dimensional map and, for example, also based on global GPS coordinates, and provides an environmental model 31 based on the two-dimensional map. According to the example, this environmental model 31 is a fused static and dynamic environmental model.

The sensor unit position for each sensor unit, function block 19, or the corresponding information 19 is calculated from function blocks 10, 11 and 12, for example. In this case, $\vec{\theta}_{1:m,meas}(t)$ is, for example, the vector of the articulation angle measurements and $\vec{\sigma}_{\Theta 1:m,meas}(t)$ is, for example, the vector of the articulation angle measurement variances. $\vec{x}_{1:m}(t)$ denotes the estimated sensor state vectors in the reference coordinate system.

The driving dynamics information 10 relating to the first and/or the second vehicle unit A, B includes, for example, the speed in the longitudinal direction of the respective vehicle unit, as well as the pivot angle Θ between the first and second vehicle unit, wherein, on the basis of this information, the electronic control unit calculates a sensor unit position 19 for each sensor unit 1, 2, 3, 4, 5, 6, 7, 8, 9 at defined times and, on the basis of this sensor unit position 19 and the output data from the sensor units 1, 2, 3, 4, 5, 6, 7, 8, 9, calculates data relating to the static and the dynamic environmental model 20, 21 and thus the resulting environmental model 30.

According to the example, the dynamic environmental model and the two-dimensional map of the environmental model 22 are calculated at least on the basis of the driving dynamics information 10 and the sensor unit positions 19.

The driving dynamics information 10 is used to distinguish between dynamic and static captured objects/points which are included in the environmental data relating to the dynamic or static environmental model 20, 21.

In function blocks 20, 21, 22, the input data of the respective function block are respectively fused by way of example.

The environmental model of the static environmental data 20 includes, for example, points and/or objects which are captured by the sensor units 1 to 9 and are calculated and stored in the at least two-dimensional map of the environmental model 22 as a first table or matrix or database.

The dynamic environmental data 21, which are calculated and stored in an additional table or matrix or database, are generated, for example, on the basis of points and/or objects captured by the sensor units 1 to 9, wherein these points and/or objects themselves have a speed that differs from zero, or the dynamic environmental data 21 are calculated and stored in the first table or matrix or database, wherein the dynamic information is contained in the changes to the data records with different time stamps.

In the electronic control unit, the at least two-dimensional map 22 of the environmental model accesses further information, according to the example, or this map is supplemented with further information, from positions and/or coordinates for captured objects from a satellite navigation system and optionally, for example, from an externally generated at least two-dimensional map of the area traversed by the vehicle units A, B.

The invention claimed is:
1. A sensor system comprising at least a first sensor and a second sensor, wherein the sensor system is configured to at least partially capture the environment of at least a first vehicle and a second vehicle pivotably coupled to one another,
   wherein the first sensor and the second sensor are positioned separately from one another,
   wherein the first sensor is positioned on the first vehicle and the second sensor is positioned on the second vehicle, wherein the first sensor and the second sensor capture different environmental areas, wherein the sensor system has an electronic controller connected to the first sensor and the second sensor, wherein the electronic controller jointly evaluates output data from the first sensor and the second sensor, wherein the first sensor and the second sensor each provide corresponding sensor data with a corresponding item of time information, synchronized by the electronic controller, and the electronic controller is configured to take into account a relative positioning of the first sensor and the second sensor when generating an environmental model.

2. The sensor system as claimed in claim 1, wherein the first sensor and the second sensor are positioned in a manner pivotable by a defined pivot angle relative to one another in terms of their relative positioning with respect to a first defined axis, and wherein the electronic controller is configured to take into account the pivot angle and/or an item of information dependent thereon when generating the environmental model at least at defined times, at synchronous times with respect to a common time base.

3. The sensor system as claimed in claim 1, wherein the environmental model has an at least two-dimensional map of positions and/or coordinates which has been/is stored and/or calculated in the electronic controller and in which points and/or objects captured and/or detected by the first sensor and the second sensor are provided as output data from the first sensor and the second sensor and are entered and/or included in the at least two-dimensional map, depending at least on a respective time stamp in the output data and a temporally substantially equal and/or synchronous pivot angle.

4. The sensor system as claimed in claim 3, wherein the at least two-dimensional map of the environmental model is in the form of a first table and/or matrix and/or database and, depicts a substantially two-dimensional map in which the sensor system is located and/or through which the sensor system is moved.

5. The sensor system as claimed in claim 1, wherein the output data from the first sensor and the second sensor each have at least the point in time, a distance, an item of position information, a speed and/or a relative speed of detection of a point and/or an object by the first sensor or the second sensor, respectively.

6. The sensor system as claimed in claim 1, wherein an item of information relating to the positioning in the sense of the static fastening of each sensor is available in the electronic controller, wherein the information relating to the positioning is defined relative to a reference coordinate system of at least one of the first vehicle and the second vehicle, the vehicle in which the sensor is positioned, stored and/or present, and at least one item of driving dynamics information relating to the first and/or the second vehicles is available, a speed in the longitudinal direction of the vehicle, and a pivot angle between the first and second vehicles, and wherein, at least on the basis of the information, the electronic controller calculates a sensor position for each of the first sensor and the second sensor at defined times and calculates data of the environmental model on the basis of the sensor position and the output data from the first and second sensors.

7. The sensor system as claimed in claim 6, wherein the environmental model comprises static environmental data relating to points and/or objects captured by the sensors, which are stored and/or calculated in an at least two-dimensional map of the environmental model as a first table and/or matrix and/or database, and dynamic environmental data, which are stored and/or calculated in an additional table and/or matrix and/or database and are generated on the basis of points and/or objects captured by the sensors, wherein the points and/or objects have a speed that differs from zero, or wherein the dynamic environmental data are stored and/or calculated in the first table and/or matrix and/or database, wherein the dynamic environmental data is contained in changes to data records with different time stamps.

8. The sensor system as claimed in claim 3, wherein the at least two-dimensional map of the environmental model in the electronic controller accesses further information and/or is supplemented with further information, from positions and/or coordinates for captured objects from a satellite navigation system and/or an externally generated at least two-dimensional map of the area traversed by the first and second vehicles.

9. The sensor system as claimed in claim 3, wherein the electronic controller calculates a position of the first and/or second vehicles at least from the output data from the first sensor and the second sensor and the data from the at least two-dimensional map of the environmental model.

10. A method for generating or calculating an at least two-dimensional map of an environmental model as a first table and/or matrix and/or database by a sensor system of at least a first vehicle and a second vehicle pivotably coupled to one another, the sensor system comprising at least a first sensor and a second sensor positioned on the first vehicle and the second vehicle, respectively, wherein the first sensor and the second sensor capture different environmental areas, and an electronic controller connected to the first sensor and the second sensor, the method performed by the electronic controller and comprising:

receiving corresponding sensor data with a corresponding item of time information from each of the first sensor and the second sensor;

synchronizing the corresponding item of time information from each of the first sensor and the second sensor;

jointly evaluating output data from the first sensor and the second sensor;

generating an environmental model by considering a relative positioning of each of the first sensor and the second sensor; and calculating a position of at least one of the first vehicle and the second vehicle at least from the output data from the first sensor and the second sensor and the data from the at least two-dimensional map of the environmental model.

11. The sensor system as claimed in claim 1, wherein each corresponding item of time information is a separate time stamp that is assigned to a point in time when the environmental areas are captured by one of the first sensor or the second sensor, respectively.

12. The sensor system as claimed in claim 1, wherein the relative positioning of the first sensor and the second sensor comprises a mounting position or static fastening of each of the first sensor and the second sensor relative to the first vehicle and the second vehicle, respectively.

* * * * *